US009033131B2

(12) United States Patent
Lee et al.

(10) Patent No.: US 9,033,131 B2
(45) Date of Patent: May 19, 2015

(54) TRANSFERRING MECHANISM

(71) Applicant: HON HAI PRECISION INDUSTRY CO., LTD., New Taipei (TW)

(72) Inventors: Teh-Yuh Lee, New Taipei (TW); Wei-Jung Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 4 days.

(21) Appl. No.: 14/014,760

(22) Filed: Aug. 30, 2013

(65) Prior Publication Data

US 2014/0112750 A1    Apr. 24, 2014

(30) Foreign Application Priority Data

Oct. 22, 2012   (TW) .............................. 101138973 A

(51) Int. Cl.
| | |
|---|---|
| B65G 37/00 | (2006.01) |
| B65G 49/00 | (2006.01) |
| B23Q 7/04 | (2006.01) |
| B23Q 7/16 | (2006.01) |
| B23P 19/00 | (2006.01) |

(52) U.S. Cl.
CPC *B65G 49/00* (2013.01); *B23Q 7/04* (2013.01); *B23Q 7/16* (2013.01); *B23P 19/007* (2013.01)

(58) Field of Classification Search
CPC ............. B65G 49/025; B65G 49/0463; B65G 49/0459; B65G 21/20; B65G 2207/14; B65G 47/53; B65G 47/90; B65G 47/52; B65G 37/02

USPC .......... 198/346.1, 346.3, 468.6, 468.8, 468.9, 198/580; 414/749.1, 749.6

See application file for complete search history.

(56) References Cited

U.S. PATENT DOCUMENTS

| | | | | |
|---|---|---|---|---|
| 3,315,778 | A * | 4/1967 | Kendall, Jr. et al. ....... | 198/465.2 |
| 4,934,507 | A * | 6/1990 | Blocker ..................... | 198/346.2 |
| 5,658,115 | A * | 8/1997 | Yamazaki et al. ......... | 414/751.1 |
| 5,671,916 | A * | 9/1997 | Kaneko ...................... | 198/468.6 |
| 5,727,917 | A * | 3/1998 | Fuke et al. ................ | 414/331.13 |
| 6,095,317 | A * | 8/2000 | Waldner et al. ............ | 198/463.2 |
| 7,900,767 | B2 * | 3/2011 | Spangler et al. ........... | 198/463.3 |
| 8,459,442 | B2 * | 6/2013 | Morimoto et al. ......... | 198/468.6 |

* cited by examiner

*Primary Examiner* — James R Bidwell
(74) *Attorney, Agent, or Firm* — Novak Druce Connolly Bove + Quigg LLP

(57) ABSTRACT

A transferring mechanism for transferring a workpiece from a tray to a fixture is provided. The transferring mechanism includes a main bracket defining an uploading hole thereon, an uploading assembly, a pick-up assembly and a transferring assembly. The pick-up assembly is located under the uploading hole. The pick-up assembly is mounted on the main bracket above the uploading hole. The transferring assembly includes a fixing bracket and a first transferring subassembly and a blocking member. The fixing bracket is mounted on the main bracket and located under the pick-up assembly. The first transferring subassembly is mounted on the fixing bracket. The blocking member is mounted on the first transferring subassembly and includes a driving portion. The driving portion moves upward to block and position the fixture to enable the pick-up assembly to release the workpiece on the fixture.

19 Claims, 5 Drawing Sheets

TRANSFERRING MECHANISM

BACKGROUND

1. Technical Field

The present disclosure relates to transferring mechanisms, and more particularly, to an automatic transferring mechanism used in automated production line.

2. Description of Related Art

In automated production line for manufacturing, a transferring mechanism is employed to transmit workpieces to enhance efficiency and save labor. The typical transferring mechanism includes a pick-up assembly and a transferring assembly adjacent to the pick-up assembly. The pick-up assembly picks up a workpiece and releases the workpiece to a fixture in the transferring assembly. The transferring assembly transmits the workpiece and the fixture to a next workstation. When the pick-up assembly releases the workpiece, the transferring assembly is in a moving state, an accuracy of the releasing of the workpiece is thereby reduced. In addition, the workpiece and the fixture may be damaged by the pick-up assembly if the pick-up is done incorrectly, therefore a yield is reduced.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
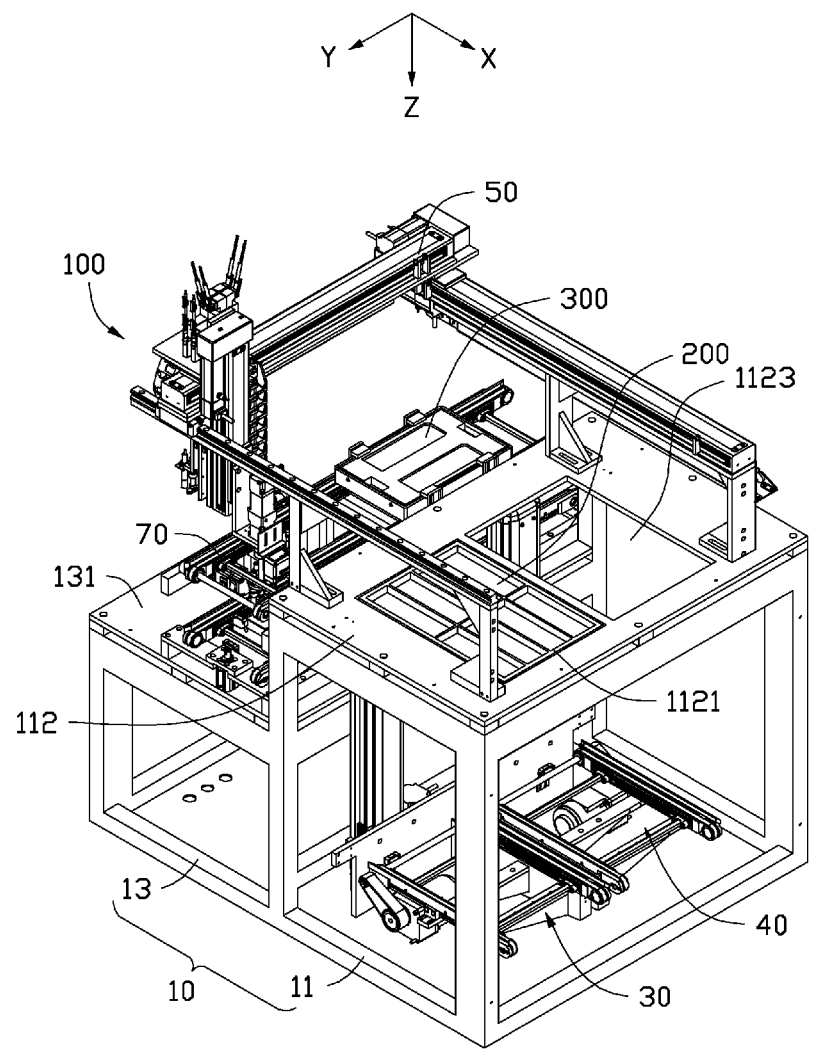
FIG. 1 is an isometric view of an embodiment of a transferring mechanism including an uploading assembly, a collecting assembly, a pick-up assembly and a transferring assembly.

FIG. 1 shows an embodiment of a transferring mechanism 100 employed to transfer a workpiece (not shown) from a tray 200 to a fixture 300. The transferring mechanism 100 includes a main bracket 10, an uploading assembly 30, a collecting assembly 40, a pick-up assembly 50 and a transferring assembly 70.

The main bracket 10 is a substantially a stepped frame, and includes a first frame 11 and a second frame 13 perpendicularly extending from a side of the first frame 11. A height of the first frame 11 is greater than that of the second frame 13. The first frame 11 is cubic and includes a first top plate 112. The first top plate 112 defines an uploading hole 1121 therein and a collecting hole 1123 adjacent to the uploading hole 1121. The uploading hole 1121 and the collecting hole 1123 are separate from each other. The second frame 13 includes a second top plate 131 at a top side thereof parallel to the first top plate 112 of the first frame 11. The second top plate 131 is lower than the first top plate 112.

Figure 2:
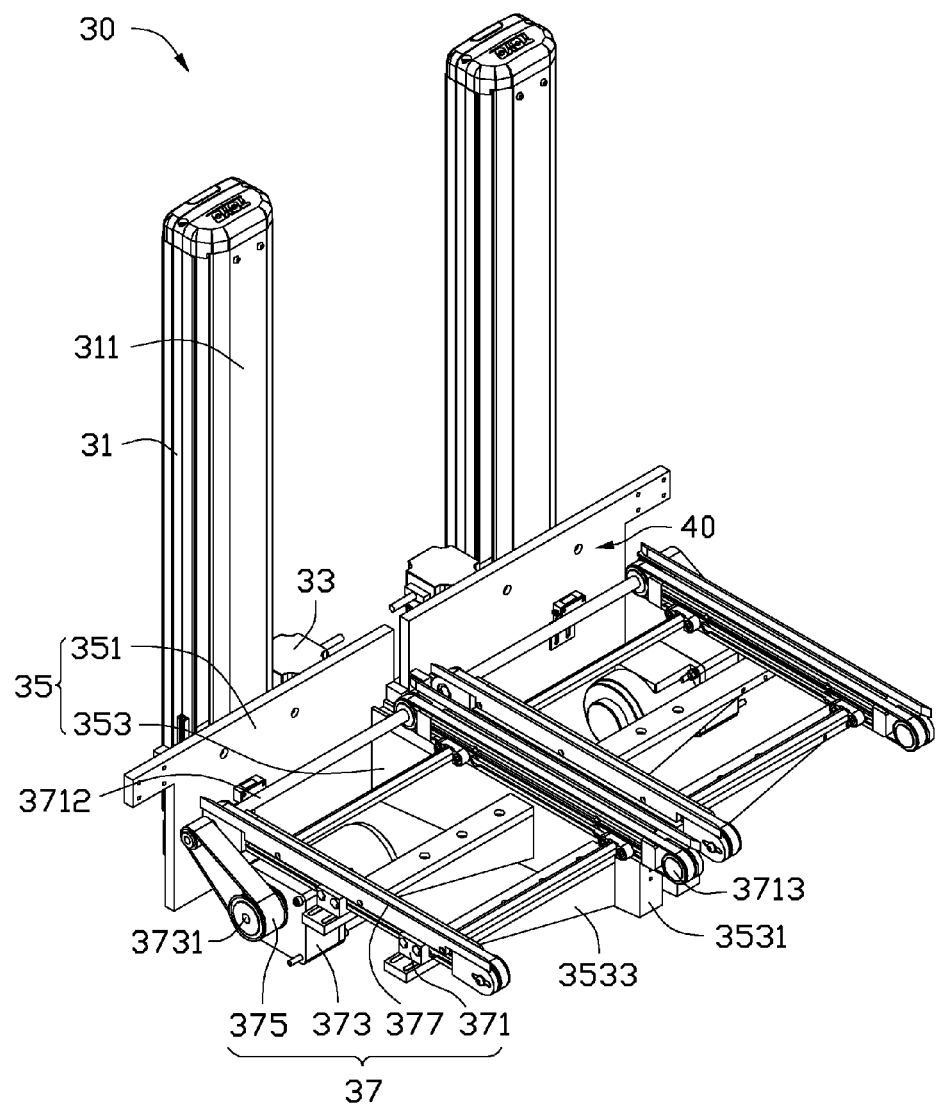
FIG. 2 is an isometric view of the uploading assembly and the collecting assembly of FIG. 1.
Figure 3:
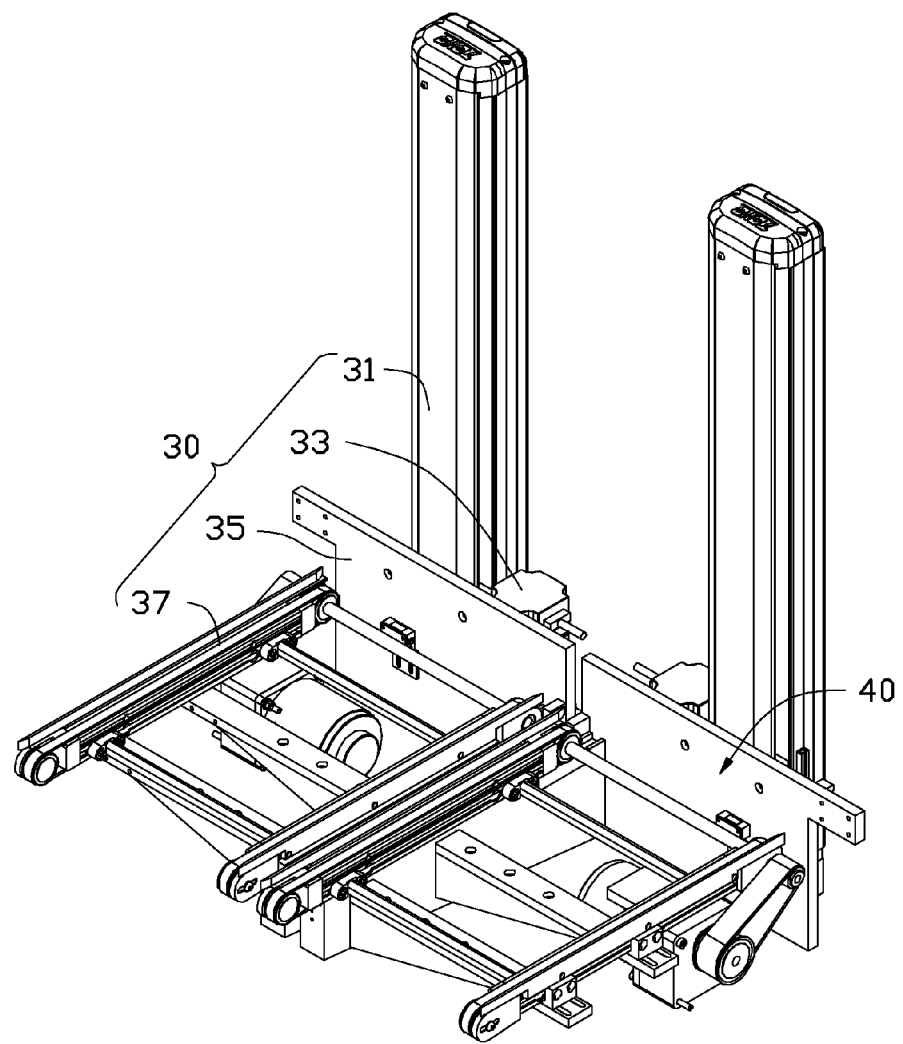
FIG. 3 is similar to FIG. 2, but viewed from another aspect.

Also referring to FIGS. 2 and 3, the uploading assembly 30 is received in the first frame 11 under the uploading hole 1121 of the first top plate 112. The collecting assembly 40 is received in the first frame 11 under the collecting hole 1123 of the first top plate 112. The uploading assembly 30 has the same structure as the collecting assembly 40. The uploading assembly 30 is illustrated in detail in the drawings, and a description of the collecting assembly 40 is omitted here.

The uploading assembly 30 includes a guiding member 31, a first motor 33, a sliding seat 35, and a transporting subassembly 37. The guiding member 31 is mounted on the first frame 11 and arranged adjacent to the second frame 13. The guiding member 31 includes a guiding portion 311 extending along a Cartesian Z direction. The first motor 33 is mounted adjacent to an end of the guiding member 31. The sliding seat 35 is slidably mounted on the guiding member 31 and connected to the first motor 33. The sliding seat 35 includes a main body 351 and a supporting portion 353 perpendicularly extending from a side of the main body 351 away from the second frame 13. The main body 351 slidably engages with the guiding portion 311 and is connected to the first motor 33. The supporting portion 353 is distanced from the guiding member 31. In the embodiment, the supporting portion 353 includes a fixing arm 3531 extending from the main body 351, and a plurality of supporting arms 3533 mounted on the fixing arm 3531. The plurality of supporting arms 3533 are arranged parallel to each other and extend perpendicular to the fixing arm 3531. The transporting subassembly 37 is mounted on the supporting portion 353, and includes a first bracket 371, a second motor 373, a first transferring belt 375, and a pair of second transferring belts 377. The first bracket 371 is fixed to the fixing arm 3531 and the plurality of supporting arms 3533 for supporting the trays 200.

The first bracket 371 is a rectangular frame, and includes a transferring rod 3712, and a pair of transferring pulleys 3713 arranged away from the transferring rod 3712. The second motor 373 is mounted on a bottom of the first bracket 371 and includes a driving pulley 3731. The first transferring belt 375 is sleeved on the driving pulley 3731 and an end of the transferring rod 3712. The second motor 373 drives the transferring rod 3712 to rotate via the first transferring belt 375. Each second transferring belt 377 is sleeved on one transferring pulley 3713 and one end of the transferring rod 3712, such that the transferring rod 3712 is capable of rotating the pair of second transferring belts 377. In the embodiment, the collecting assembly 40 is employed to recover empty trays 200.

Figure 4:
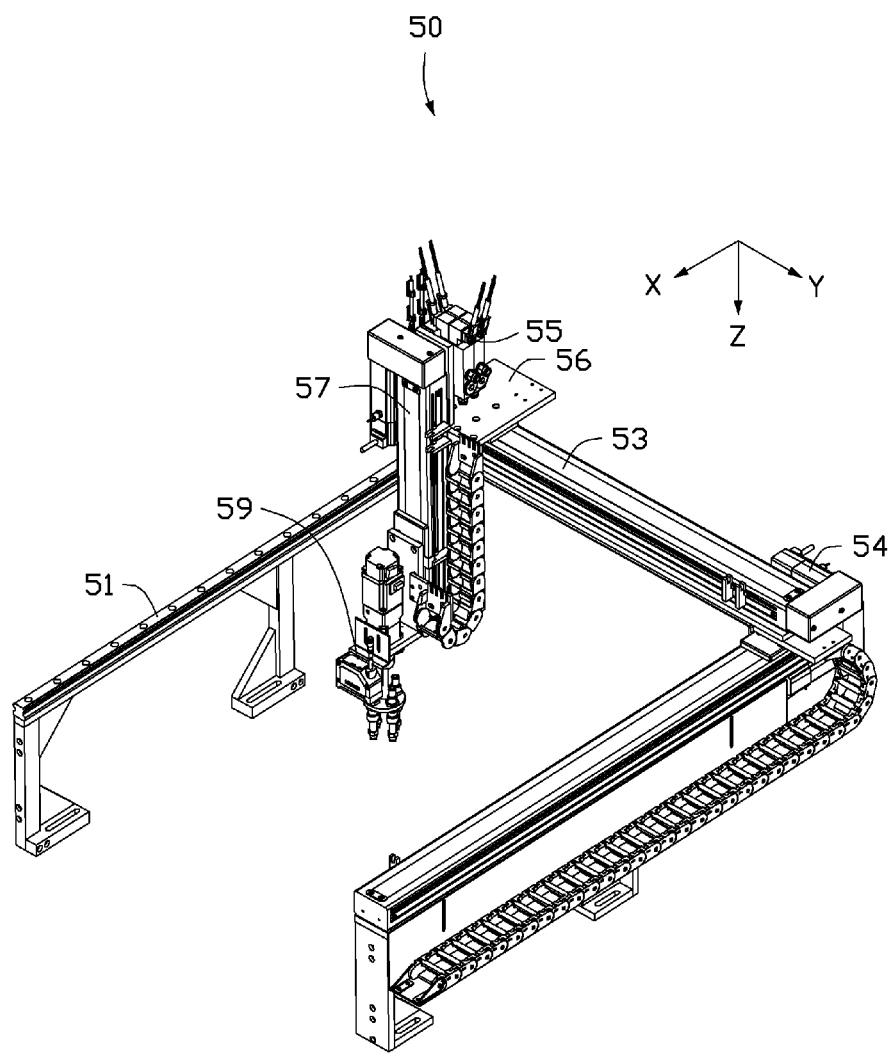
FIG. 4 is an isometric view of the pick-up assembly of FIG. 1.

Also referring to FIG. 4, the pick-up assembly 50 is mounted on the first top plate 112, and includes a pair of guiding brackets 51, a mounting seat 53, a first driving member 54, a second driving member 55, a sliding member 56, a third driving member 57, and a pick-up member 59. The pair of guiding brackets 51 is arranged on opposite edges of the first top plate 112. The pair of guiding brackets 51 extends along an X direction which is parallel to a transferring direction of the pair of second transferring belts 377. An end of the pair of guiding brackets 51 protrudes out from an end of the first top plate 112 and is located above the second frame 13. The opposite ends of the mounting seat 53 are slidably mounted on the pair of guiding brackets 51. The first driving member 54 is fixed to one guiding bracket 51 and connected to an end of the mounting seat 53 away from the second driving member 55. The second driving member 55 is mounted on the opposite end of the mounting seat 53 away from the first driving member 54. The sliding member 56 is slidably mounted on the mounting seat 53, and is connected to the second driving member 55. The sliding member 56 is driven by the second driving member 55 to slide along a Y direction on the mounting seat 53. The third driving member 57 is mounted on the sliding member 56. The pick-up member 59 is slidably mounted on the sliding member 56 and is connected to the third driving member 57. The pick-up member 59 is driven by the third driving member 57 to move along the Z direction. Such that, the pick-up member 59 is capable of moving along three axes (X, Y, Z directions forming the three axes) to pick-up the workpiece from the tray 200 and release the workpiece to the transferring assembly 70. In the embodiment, the pick-up member 59 is a vacuum-lift element. In other embodiments, the pick-up member 59 may be a clamp.

Figure 5:
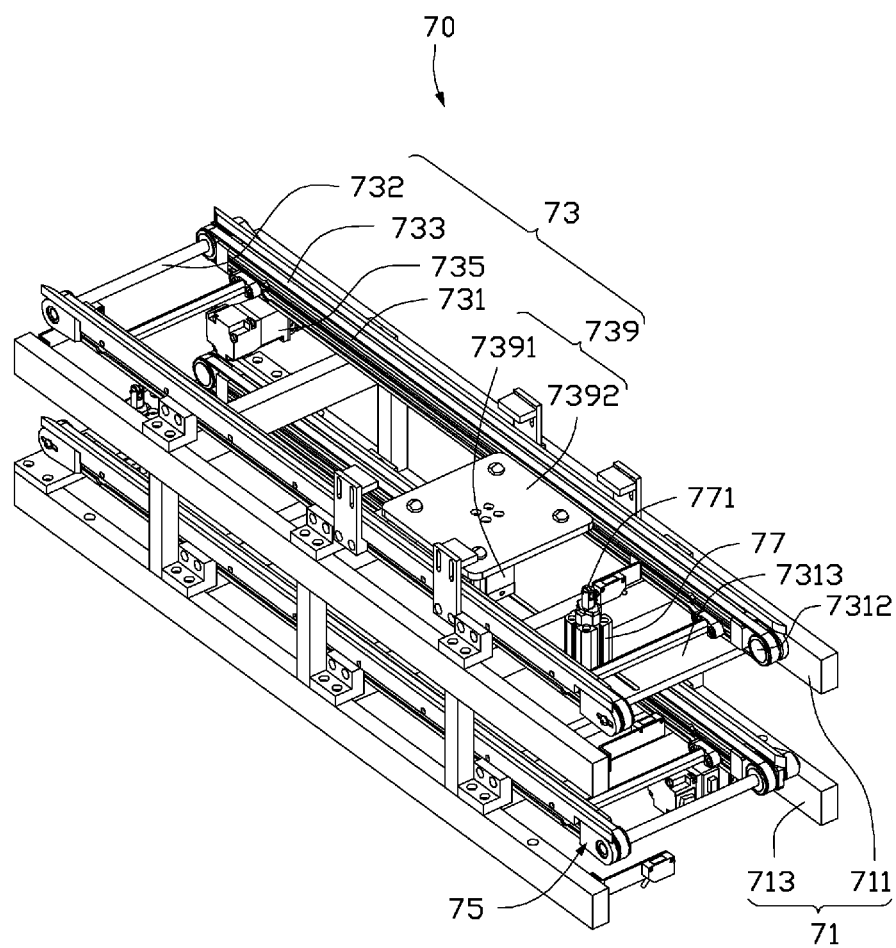
FIG. 5 is an isometric view of the transferring assembly of the transferring mechanism of FIG. 1.

Also referring to FIG. 5, the transferring assembly 70 is assembled to the second top plate 131 of the second frame 13, and located under the pair of guiding brackets 51. The transferring assembly 70 includes a fixing bracket 71, a first transferring subassembly 73, a second transferring subassembly 75, and two blocking members 77. The fixing bracket 71 is assembled to the second top plate 131, and includes a first fixing portion 711, and a second fixing portion 713 on the first fixing portion 711. The second fixing portion 713 is located under the first fixing portion 711. The first transferring subassembly 73 is assembled to the first fixing portion 711, and the second transferring subassembly 75 is assembled to the second fixing portion 713. The structure of the first transferring subassembly 73 is the same as that of the second transferring subassembly 75 and is mounted above the second transferring subassembly 75. Briefly, the first transferring subassembly 73 is illustrated as follow, the descriptions of the second transferring subassembly 75 is omitted for brevity due to redundancy. The first transferring subassembly 73 includes a second bracket 731, a rotating shaft 732, a pair of transferring bands 733, a fourth driving member 735, and a fifth driving member 739.

The second bracket 731 is fixed to the first fixing portion 711 and equipped with a pair of following pulleys 7312 on one end of the second bracket 731. The second bracket 731 is further equipped with a bearing plate 7313 adjacent to the one end thereof. The rotating shaft 732 is rotatably mounted on an end of the second bracket 731 opposite to the bearing plate 7313. Each transferring band 733 is sleeved on an end of the rotating shaft 732 and one following pulley 7312. The fourth driving member 735 is mounted on the first fixing portion 711 and connected to the rotating shaft 732. The rotating shaft 732 is driven by the fourth driving member 735 to rotate the pair of transferring bands 733. The fifth driving member 739 is mounted on the bearing plate 7313, and includes a driving main body 7391 and an output portion 7392 on the driving main body 7391. The driving main body 7391 is assembled to the bearing plate 7313, and the output portion 7392 is received in the first fixing portion 711. One blocking member 77 is mounted on the bearing plate 7313 and adjacent to the fifth driving member 739. The other blocking member 77 is mounted on the second fixing portion 713.

In the embodiment, the blocking member 77 is telescopic, and includes a driving portion 771. The driving portion 771 is capable of sliding relative to the first fixing portion 711 to block the fixture 300 on the pair of transferring bands 733. When the fixture 300 is blocked by the blocking member 77, the fixture 300 is aligned to the fifth driving member 739 and pushed upward by the output portion 7392.

In the embodiment, a transferring direction of the second transferring subassembly 75 is reverse of a transferring direction of the first transferring subassembly 73. The blocking member 77 mounted on the second fixing portion 713 and is located under an end of the first fixing portion 711 with the rotating shaft 732. When the blocking member 77 blocks one fixture 300 on the second transferring subassembly 75, the pick-up member 59 moves through the first fixing portion 711 and releases one workpiece on the fixture 300.

When assembling, the uploading assembly 30 and the collecting assembly 40 are mounted in the first frame 11 of the main bracket 10. The uploading assembly 30 is located under the uploading hole 1121, and the collecting assembly 40 is located under the collecting hole 1123. The pick-up assembly 50 is mounted on the first top plate 112 of the main bracket 10. The transferring assembly 70 is mounted on the second top plate 131 and located under the pick-up assembly 50.

When in use, the tray 200, along with the workpiece, is placed upon the pair of second transferring belts 377. The first motor 33 drives the sliding seat 35 to slide upward toward the uploading hole 1121. The pick-up member 59 is driven by the third driving member 57 to slide along the Z direction downwardly to the uploading hole 1121, and pick up a workpiece from the tray 200. The pick-up member 59 is driven by the first driving member 54 to slide along the X direction, and reaches a position above the second top plate 131, then the pick-up member 59 is driven by the second driving member 55 to slide along the Y direction and arrive at the first transferring subassembly 73. At the same time, the fixture 300 on the transferring band 733 is blocked by the blocking member 77. The fifth driving member 739 moves the fixture 300 upward via the output portion 7392, and thereby permitting the fixture 300 to reach the pick-up member 59. The pick-up member 59 is driven by the third driving member 57 to move along the Z direction toward the fixture 300, and releases the workpiece on the fixture 300. Then the fifth driving member 739 withdraws to enable the fixture 300 with the workpiece to be placed upon the transferring band 733. The blocking member 77 withdraws within the first fixing portion 711 to enable the fixture 300 to be transferred or transported to next workstation by the first transferring subassembly 73. Then, the pick-up member 59 moves back to the first top plate 112 and picks up the (empty) tray 200. The pick-up member 59 extends into the collecting hole 1123 to release the (empty) tray 200 to the collecting assembly 40. Similarly, the uploading assembly 30 moves to the uploading hole 1121 and slides along the Z direction toward the next tray 200 to pick up next workpiece from the tray 200.

When the pair of guiding brackets 51 is directly fixed to the first frame 11, the fixing bracket 71 is directly fixed to the second frame 13, and the uploading hole 1121 and the collecting hole 1123 are defined on the first frame 11 directly, thus the first top plate 112 and the second top plate 113 may be omitted. When the tray 200 is recovered by a manipulator, the collecting assembly 40 and the collecting hole 1123 may be omitted. The number of the guiding brackets 51 may be one or more than two. When the supporting portion 353 supports the tray 200 directly, the transporting subassembly 37 may be omitted. When the fixture 300 needs to be transmitted in one direction only, the second transferring subassembly 75 and the second fixing portion 713 may be omitted. The number of the second transferring belts 377, the transferring bands 733, and the blocking members 77 is not limited to two, respectively, they may be one or more than two. The structure of the first transferring subassembly 73 is not limited to above-mentioned, and may be a belt sleeved on the first fixing portion 711, and the blocking member 77 may be simply mounted on an end of the belt.

The main bracket 10 may be rectangular, the first frame 11 has a height the same as that of the second frame 13, and a height of the pair of guiding bracket 51 may be adjusted accordingly. When the transferring direction of the second transferring subassembly 75 is the same as the transferring direction of the first transferring subassembly 73, the position of the blocking member 77 of the second transferring subassembly 75 is adjusted accordingly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A transferring mechanism for transferring a workpiece from a tray to a fixture, comprising:
a main bracket defining an uploading hole thereon;
an uploading assembly mounted on the main bracket under the uploading hole for transporting the tray with the workpiece received in the tray toward the uploading hole;
a pick-up assembly mounted on the main bracket above the uploading hole for picking up the workpiece from the tray; and
a transferring assembly comprising:
a fixing bracket mounted on the main bracket and located under the pick-up assembly;
a first transferring subassembly mounted on the fixing bracket for transferring the fixture; and
a blocking member mounted on the first transferring subassembly and comprising a driving portion, wherein the driving portion is capable of moving upward to block and position the fixture to enable the pick-up assembly to release the workpiece on the fixture.

2. The transferring mechanism of claim 1, wherein the uploading assembly comprises a guiding member, a first motor, and a sliding seat, the guiding member is mounted on the first frame, the first motor is mounted adjacent to an end of the guiding member, the sliding seat is slidably mounted on the guiding member and connected to the first motor, the sliding seat is driven by the first motor to slide along the guiding member toward the uploading hole, thereby transporting the tray to the uploading hole.

3. The transferring mechanism of claim 2, wherein the guiding member comprises a guiding portion, the sliding seat comprises a main body and a supporting portion perpendicularly extending from a side of the main body away from the guiding member, the main body slidably engages with the guiding portion, and is connected to the first motor, and the supporting portion supports the tray.

4. The transferring mechanism of claim 2, wherein the uploading assembly further comprises a transporting subassembly mounted on the sliding seat, the transporting subassembly comprises a first bracket, a second motor, a first transferring belt, and a least one second transferring belt, the first bracket is fixed to the sliding seat, and comprises a transferring rod, and at least one transferring pulley arranged away from the transferring rod, the second motor is mounted on a bottom of the first bracket and comprises a driving pulley, the first transferring belt is sleeved on the driving pulley and an end of the transferring rod, the at least one second transferring belt is sleeved on the at least one transferring pulley and the transferring rod, such that the transferring rod is driven by the second motor and rotates the at least one second transferring belt to transport the tray.

5. The transferring mechanism of claim 1, wherein the pick-up assembly comprises at least one guiding bracket, a mounting seat, a first driving member, a second driving member, a sliding member, a third driving member, and a pick-up member, the at least one guiding bracket is mounted on the main bracket, the mounting seat is slidably mounted on the at least one guiding bracket, the first driving member is fixed to the at least one guiding bracket and connected to the mounting seat, the second driving member is mounted on the mounting seat, the sliding member is slidably mounted on the mounting seat and connected to the second driving member, the third driving member is mounted on the sliding member, the pick-up member is slidably mounted on the sliding member and connected to the third driving member, such that the pick-up member is capable of sliding along three directions relative to the main bracket.

6. The transferring mechanism of claim 1, wherein the first transferring subassembly comprises a second bracket, a rotating shaft, a pair of transferring bands, and a first driving member, the second bracket is fixed to the fixing bracket and comprises a pair of following pulleys at an end of the second bracket, the rotating shaft is rotatably mounted on an end of the second bracket opposite to the pair of following pulleys, each transferring band is sleeved on an end of the rotating shaft and one following pulley, the first driving member is mounted on the fixing bracket and connected to the rotating shaft, the rotating shaft is driven by the first driving member to rotate the pair of transferring bands, thereby transporting the fixture on the pair of transferring bands.

7. The transferring mechanism of claim 6, wherein the second bracket further comprises a bearing plate adjacent to the pair of following pulleys, the first transferring subassembly further comprises a second driving member, the second driving member comprises a driving main body assembled to the bearing plate and an output portion on the driving main body, the blocking member is mounted on the bearing plate and adjacent to the second driving member, when the blocking member blocks one fixture, the output portion is aligned to the fixture and pushes the fixture upward toward the pick-up assembly.

8. The transferring mechanism of claim 1, wherein the fixing bracket comprises a first fixing portion, and a second fixing portion on the first fixing portion, the second fixing portion is located under the first fixing portion, the first transferring subassembly is mounted on the first fixing portion, the transferring assembly further comprises a second transferring subassembly mounted on the second fixing portion, a transferring direction of the first transferring subassembly is reverse to a transferring direction o the second transferring subassembly.

9. The transferring mechanism of claim 1, wherein the main bracket comprises a first frame and a second frame perpendicularly extending from a side of the first frame, a height of the first frame is greater than that of the second frame, the uploading hole is defined on the first frame, the uploading assembly is received in the first frame, the pick-up assembly is mounted on a top of the first frame, and protrudes above the second frame, the transferring assembly is assembled to the second frame and located under the pick-up assembly.

10. The transferring mechanism of claim 9, wherein the first frame comprises a first top plate defining a collecting hole, the uploading hole is defined on the first top plate and adjacent to the collecting hole, the transferring mechanism further comprises a collecting assembly mounted adjacent to the uploading assembly, the collecting assembly is located under the collecting hole, the pick-up assembly picks up the empty tray from the uploading assembly and extends into the collecting hole, and releases the empty tray on the collecting assembly.

11. A transferring mechanism for transferring a workpiece from a tray to a fixture, comprising:
a main bracket comprising:

a first frame; and a second frame perpendicularly extending from a side of the first frame, a height of the first frame being greater than that of the second frame;

an uploading assembly received in the first frame for transporting the tray with the workpiece received in the tray;

a pick-up assembly mounted on a top of the first frame, and protruding toward a side above the second frame, the pick-up assembly being capable of picking up the workpiece from the tray; and a transferring assembly assembled to the second frame and located under the pick-up assembly, the transferring assembly comprising:

a fixing bracket mounted on the second frame;

a first transferring subassembly mounted on the fixing bracket for transferring the fixture; and a blocking member mounted on the first transferring subassembly and comprising a driving portion, wherein the driving portion is capable of moving upward to block and position the fixture to enable the pick-up assembly to release the workpiece on the fixture.

12. The transferring mechanism of claim 11, wherein the uploading assembly comprises a guiding member, a first motor, and a sliding seat, the guiding member is mounted on the first frame, the first motor is mounted adjacent to an end of the guiding member, the sliding seat is slidably mounted on the guiding member and connected to the first motor, the sliding seat is driven by the first motor to slide along the guiding member toward the pick-up assembly.

13. The transferring mechanism of claim 12, wherein the guiding member comprises a guiding portion, the sliding seat comprises main body and a supporting portion perpendicularly extending from a side of the main body away from the guiding member, the main body slidably engages with the guiding portion, and is connected to the first motor, and the supporting portion supports the tray.

14. The transferring mechanism of claim 12, wherein the uploading assembly further comprises a transporting subassembly mounted on the sliding seat, the transporting subassembly comprises a first bracket, a second motor, a first transferring belt, and at least one second transferring belt, the first bracket is fixed to the sliding seat, and comprises a transferring rod, and at least one transferring pulley arranged away from the transferring rod, the second motor is mounted on a bottom of the first bracket and comprises a driving pulley, the first transferring belt is sleeved on the driving pulley and an end of the transferring rod, the at least one second transferring belt is sleeved on the at least one transferring pulley and the transferring rod, such that the transferring rod is driven by the second motor and rotates the at least one second transferring belt to transport the tray.

15. The transferring mechanism of claim 11, wherein the pick-up assembly comprises at least one guiding bracket, a mounting seat, a first driving member, a second driving member, a sliding member, a third driving member, and a pick-up member, the at least one guiding bracket is mounted on the main bracket, the mounting seat is slidably mounted on the at least one guiding bracket, the first driving member is fixed to the at least one guiding bracket and connected to the mounting seat, the second driving member is mounted on the mounting seat, the sliding member is slidably mounted on the mounting seat and connected to the second driving member, the third driving member is mounted on the sliding member, the pick-up member is slidably mounted on the sliding member and connected to the third driving member, such that the pick-up member is capable of sliding along three directions relative to the main bracket.

16. The transferring mechanism of claim 11, wherein the first transferring subassembly comprises a second bracket, a rotating shaft, a pair of transferring bands, and a first driving member, the second bracket is fixed to the fixing bracket and comprises a pair of following pulleys at an end of the second bracket, the rotating shaft is rotatably mounted on an end of the second bracket opposite to pair of following pulleys, each transferring band is sleeved on an end of the rotating shaft and one following pulley, the first driving member is mounted on the fixing bracket and connected to the rotating shaft, the rotating shaft is driven by the first driving member to rotate the pair of transferring bands, thereby transporting the fixture on the pair of transferring bands.

17. The transferring mechanism of claim 16, wherein the second bracket further comprises a bearing plate adjacent to the pair of following pulleys, the first transferring subassembly further comprises a second driving member, the second driving member comprises a driving main body assembled to the bearing plate and an output portion on the driving main body, the blocking member is mounted on the bearing plate and adjacent to the second driving member, when the blocking member blocks one fixture, the output portion is aligned to the fixture and pushes the fixture upward toward the pick-up assembly.

18. The transferring mechanism of claim 11, wherein the fixing bracket comprises a first fixing portion, and a second fixing portion on the first fixing portion, the second fixing portion is located under the first fixing portion, the first transferring subassembly is mounted on the first fixing portion, the transferring assembly further comprises a second transferring subassembly mounted on the second fixing portion, a transferring direction of the first transferring subassembly is reverse to a transferring direction o the second transferring subassembly.

19. The transferring mechanism of claim 11, wherein the first frame comprises a first top plate defining an uploading hole and a collecting hole adjacent to the collecting hole, the uploading assembly is located under the unloading hole, the transferring mechanism further comprises a collecting assembly mounted adjacent to the uploading assembly, the collecting assembly is located under the collecting hole, the pick-up assembly picks up the empty tray and extends into the collecting hole, and releases the empty tray on the collecting assembly.

* * * * *